July 10, 1934.  H. O. BEATTY  1,965,999
FILTER
Filed June 6, 1931  3 Sheets-Sheet 1
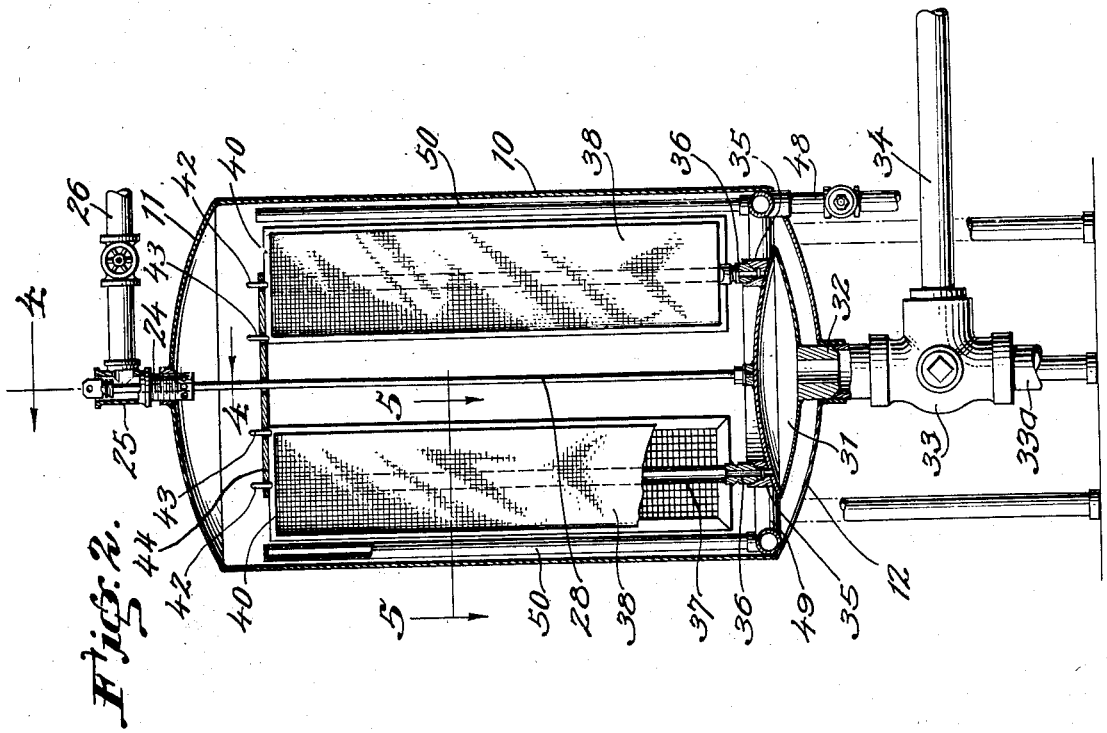
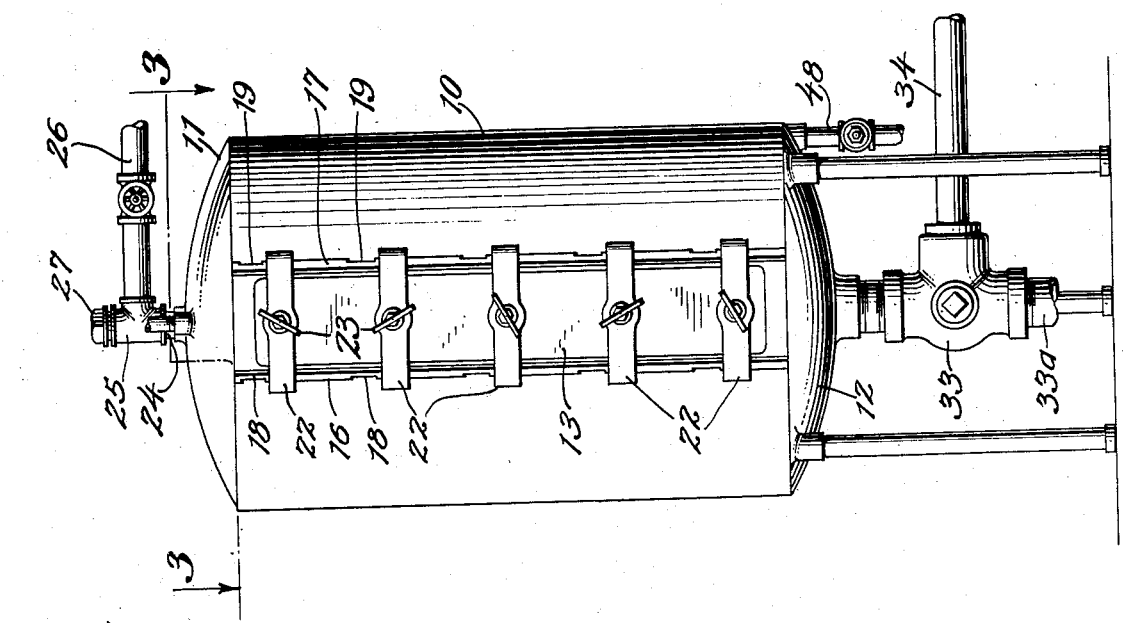
INVENTOR
*Herbert Oliver Beatty*
BY
*Charles L. Stokes*
ATTORNEY

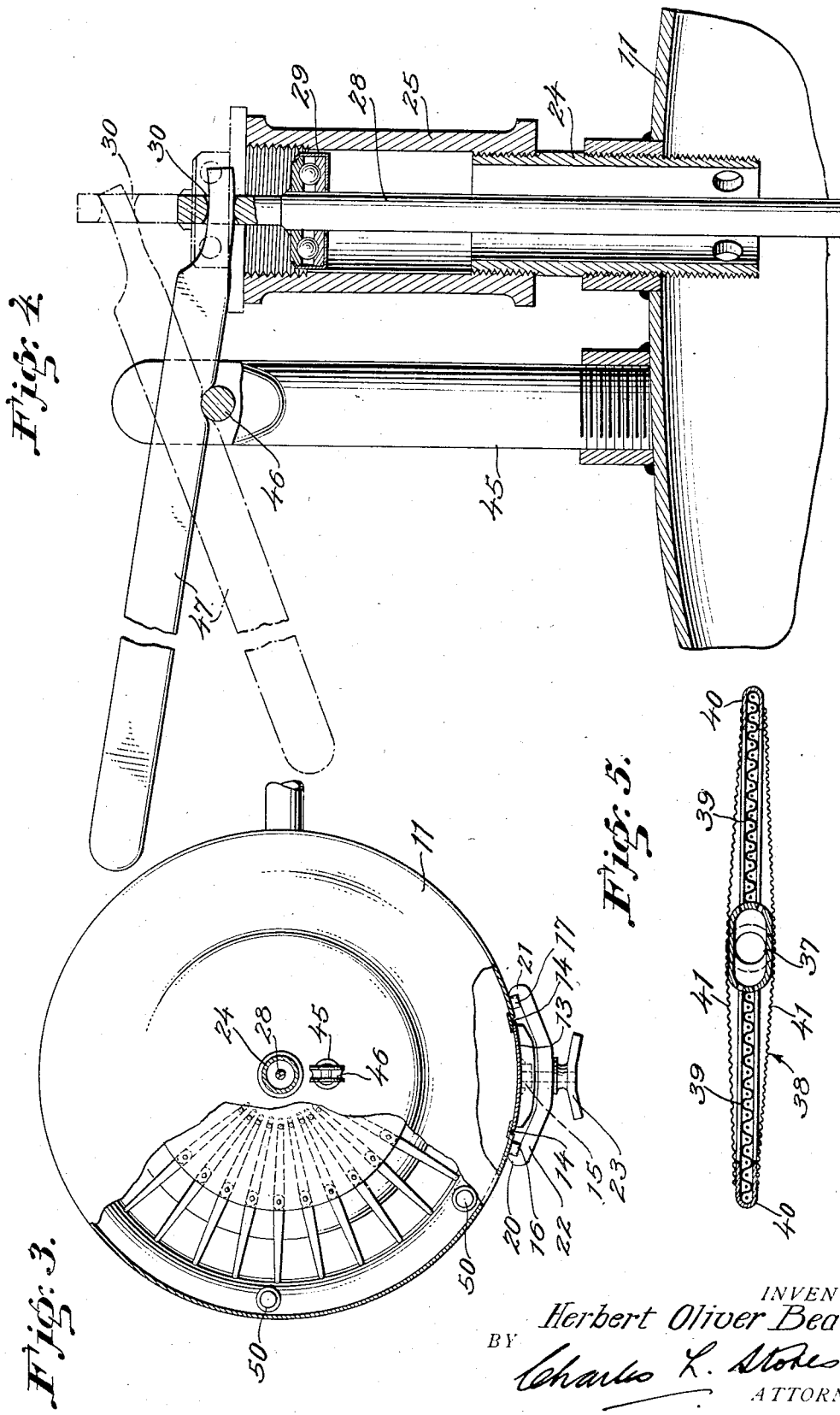

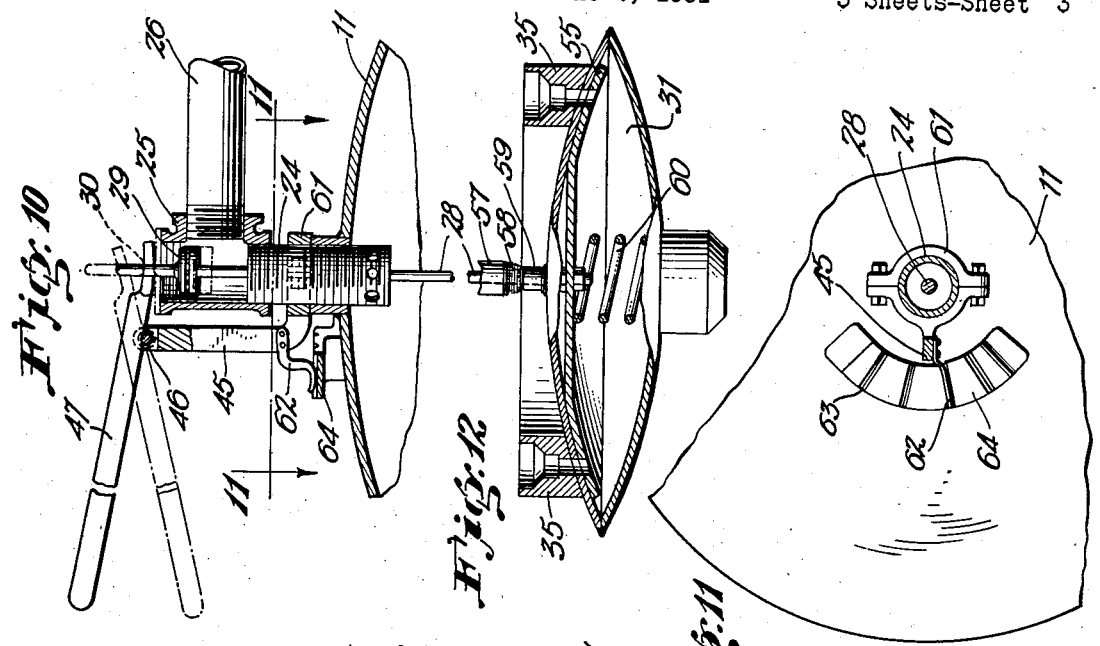
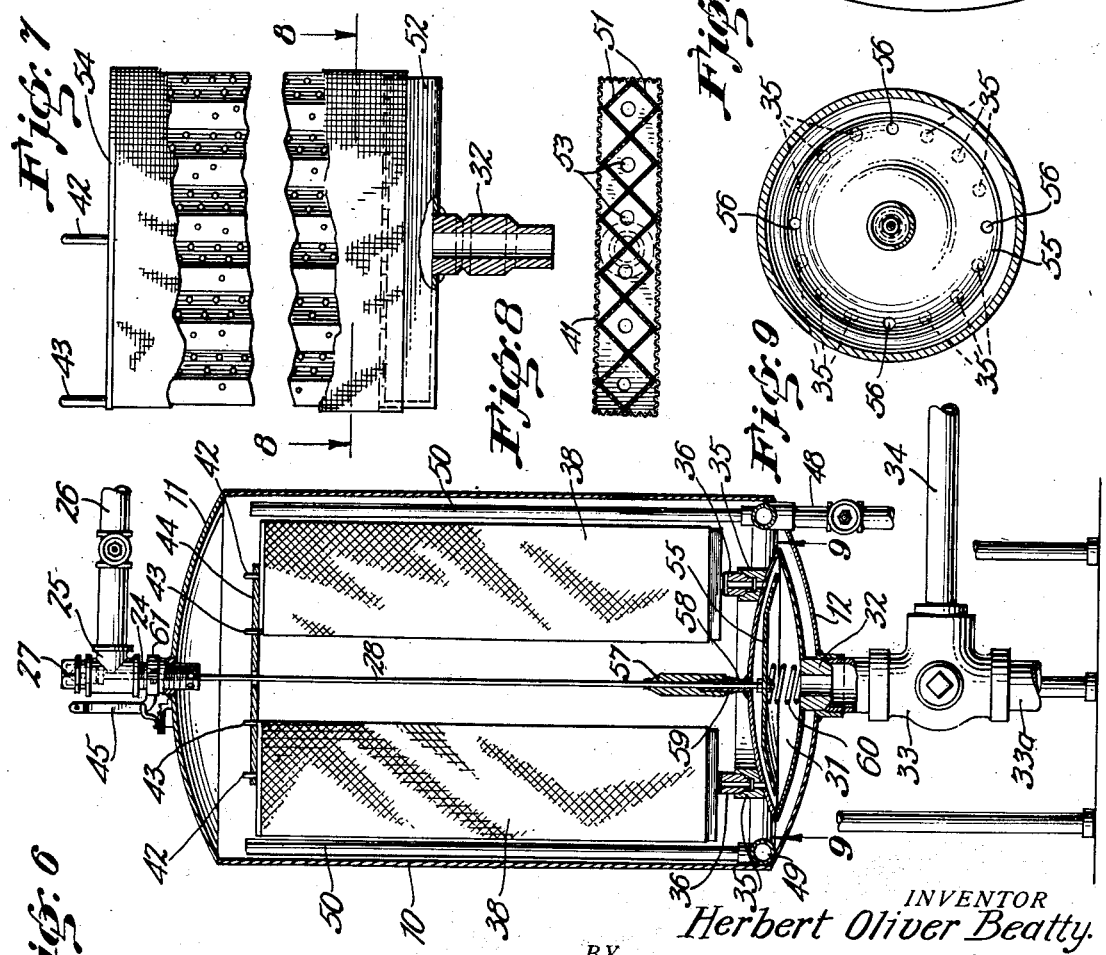

Patented July 10, 1934

1,965,999

UNITED STATES PATENT OFFICE 1,965,999

FILTER

Herbert Oliver Beatty, Los Angeles, Calif., assignor to Herbert Calvin Hillabold, Chicago, Ill.

Application June 6, 1931, Serial No. 542,653

7 Claims. (Cl. 210—181)

This invention relates to apparatus for filtering liquids and has for its principal object the provision if simplified mechanism whereby liquids are separated from contained impurities and the impurities removed expeditiously from the apparatus.

Another object is to provide a filter mechanism including a plurality of filter plates, so constructed and arranged that the plates are easily removable from the assembly for cleaning, or repair.

A further object is to arrange filter mechanism containing a plurality of filter plates to operate upon substantially any liquid at a proper superatmospheric pressure and provided with means to rotate the assembly of filter plates for ready withdrawal from the mechanism.

Referring to the drawings:

Fig. 1 is an elevation of the filter mechanism assembly.

Fig. 2 is a vertical sectional view of Fig. 1.

Fig. 3 is a top broken away view along the lines 3—3 of Fig. 1.

Fig. 4 is a sectional detail along the lines 4—4 of Fig. 2.

Fig. 5 is a sectional detail along the lines 5—5 of Fig. 2.

Fig. 6 is a vertical sectional view of a modification.

Fig. 7 is an elevation of an alternative filter construction.

Fig. 8 is a view along the lines 8—8 of Fig. 7.

Fig. 9 is a view along the lines 9—9 of Fig. 6.

Fig. 10 is a sectional detail of part of Fig. 6.

Fig. 11 is a view along the lines 11—11 of Fig. 10.

Fig. 12 is a sectional detail of part of Fig. 6.

A cylindrical casing 10 has welded, or otherwise pressure tight affixed, thereto a top 11 and a bottom 12, preferably of dished form as shown. In construction, a portion of the cylinder 10 is cut out with the torch to form a detachable door 13 which has welded thereto longitudinal flanges 14 and a series of threaded sockets 15. On the exterior of cylinder 10, longitudinal clamping and guide rails 16 and 17 are provided on each side of the aperture from which door 13 is cut, the rails 16 and 17 being provided with a series of notches or recesses 18 and 19, respectively, to permit the insertion of the ends 20 and 21 of a series of clamps 22. Each clamp 22, when its ends 20 and 21 are passed into notches 18 and 19, is adapted to be slid along the rails 16 and 17 to register with a socket 15 to the end that a threaded handle 23 may be passed centrally through each clamp 22 and be threaded into a socket 15 whereupon, by providing gaskets between flanges 14 and casing 10, a pressure exerted by turning handles 23 will cause a fluid tight joint to be made between door 13 and casing 10, it being understood that door 13 is primarily entered sidewise into casing 10 before being clamped into position and also that like top and bottom flanges (not shown) are provided for the door 13.

Top 11 is provided with a central nipple 24 to which is threaded a T 25 coupled with a valved inlet pipe 26 for material to be filtered, the upper end of T 25 being normally closed tight by a plug 27.

A rod 28 passes centrally through casing 10, nipple 24, the T 25 and has affixed thereto a ball thrust bearing 29, the upper end of rod 28 being flattened and containing an orifice 30 therein.

The lower end of rod 28 is fastened to a collector 31 comprising two concave dishes welded together, the lower part of the collector being provided with a ground joint 32 adapted to fit into a valve fitting 33 and having discharge pipes 33a and 34. The upper part of collector 31 is provided with a plurality of sockets 35 adapted to receive a plurality of nipples 36 as ground joints, each nipple 36 forming the discharge end of a perforated pipe 37 fastened centrally to and extending interiorly and longitudinally of a filter plate 38; it being especially noted that the weight of filter plate 38 serves to hold nipples 36 and sockets 35 in liquid tight relation without packing.

Each filter plate 38 is formed by welding a coarse mesh screen 39 on each side of pipe 37, said screens 39 being capped by welding solid metal plates 40 thereto to form a frame and the whole may then be covered with a suitable filter cloth, such as canvas, or may have a filter element, such as monel metal cloth 41 affixed to frames 40.

Frames 40 are provided with a central pivot 42 and an aligning pivot 43, both adapted to be registered in orifices in a circular tie plate 44 to the end that each filter plate 38 is held in radial alignment in casing 10, tie plate 44 being free to be lifted clear of pivots 42 and 43, thus permitting filter plates 38 to be easily removed from sockets 35 and through door 13.

In order to permit such removal of the filter plates 38 and to clean the interior of casing 10, a stand 45 is fastened to the top 11 to form a fulcrum point 46 on which a lever 47 is mounted, the end of lever 47 passing through orifice 30 in rod 28 (after removal of cap 27) to lift the whole of the interior assembly to the position of the dotted lines shown in Fig. 4 whereby joint 32 is clear of fitting 33. As soon as the upper limit of such lift is reached, as when bearing 29 is clear of T 25, a suitable support, such as a metal yoke, is slipped between the bearing 29 and upper end of T 25 which will support the whole of said interior assembly. When this is done, lever 47 may be lifted off fulcrum 46 and used to easily revolve the whole of the interior assembly and align filter plates 38 with door 13 for removal therethrough.

A valved pipe 48 connects with a circular interior distributor pipe 49 from which a plurality of perforated stand pipes 50 rise, the perforations being directed towards filter plates 38, or in radial alignment with casing 10 and tie plate 44, in order to clean the plates 38 without removal, as will be further described.

In operation, pipe 48 being closed, pipes 26 and 34 being open, door 13 and plug 27 being in place, and the interior assembly being set as shown in Fig. 2, a liquid to be filtered comprising water, gasoline or the like containing impurities to be separated therefrom and perhaps carrying any kind of well known filter aid such as diatomaceous earth, clay or the like, is forced under pressure through pipe 26 into the interior of casing 10.

The liquid is forced through the filter elements 38 to the interior of frames 40, the impurities and filter aid being caught and built up on said elements while the purified liquid passes through the perforations in pipes 37 to be received in collector 31 and discharged therefrom through pipe 34.

After a predetermined time period, the flow of purified liquid will become diminished, due to the accumulation of impurities on filter plates 38, and it becomes necessary to clean said plates and the interior of the casing 10.

This may be accomplished by cutting off the flow of impure liquid through pipe 26, opening pipe 48, and forcing a flow of clean liquid through pipe 34 whereby a flow the reverse of that described occurs, the pressure of the liquid forcing all impurities and filter aid from the exterior of plates 38, part of which falls to the bottom of casing 10 and part is carried off with the flushing liquid through perforated pipes 50, distributor 49 and pipe 48.

As soon as sufficient flushing has been done in this manner, the reverse flow of liquid through pipe 34 is discontinued and the whole interior assembly is raised, as already described, whereupon the flushing liquid is forced through pipes 48, 49 and 50 under high pressure to scour the exterior of plates 38 and the entire mass of separated impurities and flushing liquid is discharged through pipe 33a to the sewer fitting 33 containing a three-way valve alternating in connecting pipes 33a and 34 with casing 10.

Alternatively, with the interior assembly in the lowered position, flushing liquid may be forced through pipes 34, 48, 49, and 50 to be discharged through pipe 26 and then the interior assembly may be raised and flushing continued only through pipes 48, 49, and 50 to be discharged only through pipe 33a.

In this manner, a large filter area is provided in a confined space which is highly necessary in certain factory installations whereby cleaning of a filter of large capacity may be accomplished without disassembling the mechanism and further the filter elements are readily removable, replaceable, and interchangeable.

For instance, the ratio of filtering area possible in the herein described constructions to the space necessary for operating the filter mechanism is practically doubled when compared to known filter equipment, because of the complete absence of the necessity for removable heads, or bottoms, used in older types when cleaning or repairing is in progress.

In the modification shown in Figs. 6 to 12 inclusive, the outer construction of the filter is substantially the same as already described. However, certain advantageous changes are incorporated in the structure of the filter plates 38 and in the operation of the interior assembly.

The filter plates 38 are now composed of a pair of perforated corrugated plates 51 molded or soldered together and fixed at their bottom to a box-like distributor 52 having perforations 53 directed interiorly of plates 51, the upper ends of which are closed by plates 54, the whole being enclosed by a suitable filter cloth 41 as before.

The upper part of collector 31 has, of course, as many sockets 35 as there are filter plates, the flow through which in either direction now being adapted to be progressively applied for better flushing by the medium of a dished revolvable valve plate 55 having only a small proportion of orifices 56 as compared with the number of sockets 35.

Valve plate 55 is fastened to rod 28 which has a guide member 57 attached thereto, and is adapted to be held in position with respect to the upper half of collector 31 by a guide member 58; said guide members being joined telescopically and having an end of a tubular filter cloth 59 affixed to each to prevent passage of impurities.

The upper end of rod 28 is flattened and contains orifice 30 therein for the reception of lever 47, but rod 28 is now of sufficient length and pointed at its upper end to be pivoted in cap 27, thereby being forced downwardly from engagement with collector 31 when cap 27 is fastened in place in T 25 against the resistance of a spring 60.

The lower part of stand 45 is formed into a collar 61 resting on and surrounding nipple 24, and is provided with an indicator point 62 adapted to register with fixed points 63 on a segment 64 fastened to top 11 for the purpose of indicating when orifices 56 are in registry with certain sockets 35.

In operation, the flow if impure liquid is passed through pipe 26, casing 10, filter plates 38, collector 31, and pipe 34, the impurities being caught on plates 38; valve plate 55 being in its lower position as shown in Fig. 6 due to cap 27 being in place, and pipe 48 being closed.

When sufficient impurities have been collected on filter plates 38 and it is desired to clean the same, pipe 26 may be closed, pipe 48 opened, and cap 27 removed whereupon valve plate 55 will be forced by spring 61 into engagement with collector 31, whereby orifices 56 will register with certain sockets 35 according to the setting of indicator 62 and stand 45.

A reverse flow of fluid is then forced through pipe 34, but the pressure thereof is now much greater, permitting a greater flow of fluid responsive to said higher pressure and at a higher velocity through a limited number of sockets 35 and filter plates 38, thus scouring said filter plates with much increased efficiency. When the first set of filter plates are so cleaned by scouring, the remainder of the plates may be so cleaned serially by revolving valve plate 55 and rod 28 by the use of lever 47 to a predetermined new position.

When filter plates 38 are thoroughly cleaned, lever 47 is used to raise rod 28, valve plate 55, collector 31 and filter plates 38 and, the flow of fluid through pipe 34 being cut off and pipe 33a being opened, the flushing fluid is now discharged through perforated pipes 50 onto the outside of plates 38, and the whole of the impurities are discharged through pipe 33a.

In this manner an improved high pressure cleaning system gives added efficiency to the mechanism by the use of a simple construction.

The weight of filter elements 38 and collector 31 gives sufficient resistance to permit the rotation of the whole interior assembly when rod 28 is elevated by lever 47 through valve plate 55 when it is desired to remove one or all of filter elements 38 from casing 10, there being enough lost motion in the orifices in tie plate 44 to permit the easy removal of said filter elements 38.

I claim:

1. In a filter mechanism, the combination of: a casing, a plurality of hollow filter elements disposed radially of the casing, a collector supporting the lower ends of said filter elements, means to introduce liquid into said casing for passage through the filter elements into the collector, means to discharge liquid through the casing and collector, a valve plate within the collector adapted to control the discharge through the filter elements, a rod connected to the valve plate and extending beyond the upper end of the casing, and means to elevate the valve plate, filter elements and collector through said rod.

2. In a filter mechanism, the combination of: a casing, a plurality of hollow filter elements disposed radially of the casing, a collector supporting the lower ends of said filter elements in a plurality of sockets, means to introduce liquid into said casing for passage through the filter elements into the collector, means to discharge liquid through the casing and collector, a valve plate within the collector having a number of orifices less than the number of sockets and adapted to control the discharge through said sockets, a rod connected to the valve plate and extending beyond the upper end of the casing, and means to elevate the valve plate, filter elements and collector through said rod.

3. In a filter mechanism, the combination of: a casing, a plurality of hollow filter elements disposed radially of the casing, a collector supporting the lower ends of said filter elements, means to introduce liquid into said casing for passage through the filter elements into the collector, means to discharge liquid through the casing and collector adapted to control the discharge through the filter elements, a valve plate within the collector, a rod connected to the valve plate and extending beyond the upper end of the casing, and means to elevate and rotate the valve plate, filter elements and collector through said rod.

4. In a filter mechanism, the combination of: a casing, a plurality of hollow filter elements disposed radially of the casing, a collector supporting the lower ends of said filter elements, means to introduce liquid into said casing for passage through the filter elements into the collector, means to discharge liquid through the casing and collector, means to hydraulically scour the exterior of the filter elements, a valve plate within the collector adapted to control the discharge through the filter elements, a rod connected to the valve plate and extending beyond the upper end of the casing, and means to elevate the valve plate, filter elements and collector through said rod.

5. A filter comprising a cylindrical casing; a plurality of rectangular filter leaves supported within said casing and disposed radially thereof; a narrow opening extending longitudinally of said casing, a door in registration with said opening; clamps for simultaneously locking said door over said opening and reinforcing said casing against any bursting pressure to which it may be subjected; and means for rotating said leaves to a position where any given leaf is in registration with said opening.

6. A filter comprising a cylindrical casing; a plurality of rectangular filter leaves supported within said casing and disposed radially thereof; a narrow opening extending longitudinally of said casing, a door in registration with said opening; clamps for simultaneously locking said door over said opening and reinforcing said casing against any bursting pressure to which it may be subjected; a sluicing pipe provided with a series of apertures along its length supported adjacent the inner periphery of said casing and parallel to its axis; and means for collectively rotating said filter leaves so that each surface of each leaf is scanned by the streams from said sluicing pipe.

7. A filter comprising a casing; a filtrate outlet formed in the lower end of the casing; a filtrate manifold rotatively supported by and communicating with the filtrate outlet by means of a thrust bearing; filter leaves supported by and communicating with the filtrate manifold by means of tapered fittings and means for supporting the upper ends of the filter leaves.

HERBERT OLIVER BEATTY.